US009416299B2

(12) United States Patent
Kropp et al.

(10) Patent No.: US 9,416,299 B2
(45) Date of Patent: Aug. 16, 2016

(54) STRUCTURAL ACRYLIC ADHESIVE

(71) Applicant: 3M INNOVATIVE PROPERTIES COMPANY, St. Paul, MN (US)

(72) Inventors: Michael A. Kropp, Cottage Grove, MN (US); Zachary J. Thompson, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/379,322

(22) PCT Filed: Feb. 20, 2013

(86) PCT No.: PCT/US2013/026814
§ 371 (c)(1),
(2) Date: Aug. 18, 2014

(87) PCT Pub. No.: WO2013/126377
PCT Pub. Date: Aug. 29, 2013

(65) Prior Publication Data
US 2015/0038630 A1  Feb. 5, 2015

Related U.S. Application Data

(60) Provisional application No. 61/602,353, filed on Feb. 23, 2012.

(51) Int. Cl.
*C08K 3/34* (2006.01)
*C09J 4/00* (2006.01)
*C08F 287/00* (2006.01)
*C09J 153/00* (2006.01)

(52) U.S. Cl.
CPC ............... *C09J 4/00* (2013.01); *C08F 287/00* (2013.01); *C09J 153/00* (2013.01)

(58) Field of Classification Search
CPC ............................................. C09J 4/00
USPC ....................................... 524/493
See application file for complete search history.

(56) References Cited

U.S. PATENT DOCUMENTS

| 4,467,071 | A | 8/1984 | Dawdy |
| 5,330,844 | A | 7/1994 | Taguchi et al. |
| 6,433,091 | B1* | 8/2002 | Cheng ............ 525/191 |
| 6,852,775 | B1* | 2/2005 | Soglowek et al. ....... 523/109 |
| 7,776,963 | B2* | 8/2010 | Wang et al. ............ 525/71 |
| 2004/0131827 | A1* | 7/2004 | Misiak .............. 428/143 |
| 2009/0306301 | A1 | 12/2009 | Guerret et al. |
| 2012/0070660 | A1 | 3/2012 | Miyazaki et al. |
| 2013/0260042 | A1* | 10/2013 | Campbell et al. ........ 427/386 |

FOREIGN PATENT DOCUMENTS

| JP | H01 299881 | 12/1989 |
| JP | 2004 182831 | 7/2004 |
| WO | WO 02/055573 | 7/2002 |

OTHER PUBLICATIONS

PCT International Search Report from PCT/US2013/026814 mailed on May 31, 2013, 3 pages.

* cited by examiner

*Primary Examiner* — Hui Chin
(74) *Attorney, Agent, or Firm* — Dena M. Ehrich; Philip Y. Dahl

(57) ABSTRACT

There is provided an adhesive composition comprising: a) at least one acrylic functional monomer; b) a first toughening agent; c) a second toughening agent; d) an adhesion promoter; and e) a high aspect ratio filler selected from at least one of a high aspect ratio fibrillated filler and a halloycite clay filler.

12 Claims, No Drawings

STRUCTURAL ACRYLIC ADHESIVE

FIELD

This disclosure relates to two-part structural adhesive compositions. This disclosure also relates to two-part structural acrylic adhesive compositions having high aspect ratio fillers and, optionally, in combination with treated fumed silica fillers to achieve higher adhesive performance.

BACKGROUND

Two-part structural acrylic adhesives are used in bonding a variety of substrates, including plastics, composites and metals. They can also bond minimally prepped surfaces.

There exists a need for acrylic adhesive compositions that provide higher strength, particularly at higher temperatures, as well as improved shelf life and better cure of fillets.

SUMMARY

The presently disclosed adhesive composition provides, among other things, higher strength, particularly at higher temperatures, as well as improved shelf life and better cure of fillets.

In some aspects, the present disclosure provides an adhesive composition comprising: a) at least one acrylic functional monomer; b) a first toughening agent; c) a second toughening agent; d) an adhesion promoter; and e) a high aspect ratio filler selected from at least one of a high aspect ratio fibrillated filler and a halloycite clay filler. In some embodiments, the high aspect ratio filler is surface treated to improve miscibility with resins.

In some embodiments, the adhesive composition further comprises fumed silica. In some embodiments, the first toughening agent is selected from at least one of a block copolymer, a core-shell particle, and combinations thereof. In some embodiments, the block copolymer is selected from a styrene-b-butadiene-b-polymethylmethacrylate block copolymer or a polymethyl methacrylate-b-poly n-butylacrylate-b-polymethylmethacrylate block copolymer. In some embodiments, the second toughening agent is a methacrylate terminated liquid rubber.

In some embodiments, the adhesion promoter is an acidic adhesion promoter. In some embodiments, the high aspect ratio fibrillated filler is micro-fibrillated. In some embodiments, the composition has a peel value of greater than 3.5 kN/m. In some embodiments, the composition has a peel value of greater than 4.4 kN/m. In some embodiments, the composition exhibits substantially cohesive failure.

In some embodiments, the adhesive composition further comprises a cure initiator system. In some embodiments, the cure initiator system comprises a barbituric acid derivative and a metal salt. In some embodiments, the cure initiator system further comprises an organic peroxide, ammonium chloride salt, or a mixture thereof.

The above summary of the present disclosure is not intended to describe each embodiment of the present invention. The details of one or more embodiments of the invention are also set forth in the description below. Other features, objects, and advantages of the invention will be apparent from the description and from the claims.

DETAILED DESCRIPTION

Before any embodiments of the invention are explained in detail, it is to be understood that the invention is not limited in its application to the details of construction and the arrangement of components set forth in the following description. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Any numerical range recited herein includes all values from the lower value to the upper value. For example, if a concentration range is stated as 1% to 50%, it is intended that values such as 2% to 40%, 10% to 30%, or 1% to 3%, etc., are expressly enumerated. These are only examples of what is specifically intended, and all possible combinations of numerical values between and including the lowest value and the highest value enumerated are to be considered to be expressly stated in this application.

As used herein:

"fibrillated fiber" means fibers having a relatively high surface area and/or a branched structure, which in the case of branched structures can lead to a high degree of mechanical entanglement of the fibers;

"high aspect ratio" means a length to diameter ratio of an individual particle that is greater than 20, in some embodiments is between 20 and 60;

"cohesive failure" means adhesive bond failure within the adhesive layer, where substantially cohesive means 80% or more of the failure occurs within the adhesive layer.

"adhesive failure" means adhesive bond failure at the interface between the adhesive and the substrate;

"thin cohesive" means cohesive failure as described above, but where the majority of the adhesive is on one substrate "mixed" failure means that the failure is not due totally to the type of failure reported and other failure modes are also present in the bondline.

The present disclosure generally relates to an adhesive composition that provides high overlap shear strength and adhesion to metals and plastics. Surprisingly, the presently disclosed adhesive compositions provide improvements in overlap shear and peel strengths, as well as a desirable cohesive failure mode, when high aspect ratio fibrillated fillers are used. It was also surprisingly discovered that even better results in overlap shear and peel performance, as well as desirable cohesive failure can be obtained when combining high aspect ratio fibrillated fillers with fumed silica in the presently disclosed adhesive compositions.

The present disclosure provides for an adhesive composition comprising: a) at least one acrylic functional monomer; b) a first toughening agent; c) a second toughening agent; d) an adhesion promoter; and e) a high aspect ratio fibrillated filler.

Acrylic functional monomers useful in the present disclosure include acrylate-based ester monomers. In some embodiments, the acrylic functional monomers comprise a methacrylate-based ester monomer. Such a methacrylate-based ester monomer can be selected from at least one of methyl methacrylate, ethyl methacrylate, butyl methacrylate, cyclohexyl methacrylate, 2-ethylhexyl methacrylate, and tetrahydrofurfuryl methacrylate. In some embodiments, the methacrylate-based ester monomer is selected from at least one of methyl methacrylate and ethyl methacrylate. In some embodiments, the methacrylate-based ester monomer is methyl methacrylate.

Toughening agents useful as the first toughening agent in the present disclosure include elastomeric materials. In some embodiments, these elastomeric materials are polymer substances that have rubber elasticity at room temperature. For example, an elastomeric material that can be dissolved or dispersed in the adhesive composition is useful. Such elastomeric material includes various synthetic rubbers such as a methyl methacrylate-butadiene-styrene copolymer (MBS), an acrylonitrile-styrene-butadiene copolymer, a linear polyurethane, acrylonitrile-butadiene rubber, a styrene-butadiene rubber, a chloroprene rubber and a butadiene rubber, and natural rubbers. Among them, an acrylonitrile-butadiene rubber is particularly useful because of its solubility in the presently disclosed acrylic functional monomers and its bonding properties. Such elastomeric materials may be used alone or in combination.

Toughening agents useful as the second toughening agent in the present disclosure include elastomeric materials such as those disclosed above with respect to the first toughening agent.

Adhesion promoters useful in the present disclosure include acid phosphate compounds of the following formula (I)

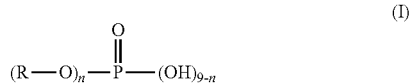

wherein R is $CH_2{=}CR_4CO(OR_5)_m{-}$ (wherein $R_4$ is hydrogen or a methyl group, $R_5$ is $-C_2H_4-$, $-C_3H_6-$, $-CH_2CH(CH_3)-$, $-C_4H_8-$, $-C_6H_{12}-$ or

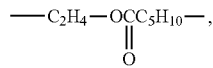

and m is an integer of from 1 to 10), and n is 1 or 2.

The acid phosphate compound of the formula (I) may, for example, be phosphoxyethyl (meth)acrylate acid, phosphoxypropyl (meth)acrylate acid or bis(2-(meth)acryloyloxyethyl) phosphate.

High aspect ratio fibrillated fillers useful in the present disclosure include organic fibers. Organic fibers may include high-density polyethylene fibers such as those commercially available under the trade designations "SYLOTHIX 52®", "SYLOTHIX 53®" and "ARBOTHIX PE100" (from EP Minerals in Reno, Nev., USA), "SHORT STUFF® ESS2F", "SHORT STUFF® ESS50F" and "SHORT STUFF® ESS5F" (from MiniFIBERS, INC. in Johnson City, Tenn., USA), and "INHANCE® PEF" (from Inhance/Fluoro-Seal, Limited in Houston, Tex., USA). Organic fibers may also include high density aramid fibers such as those commercially available under the trade designation "INHANCE® KF" (from Inhance/Fluoro-Seal, Limited in Houston, Tex., USA)

The presently disclosed adhesive composition may also include fumed silica.

Curing systems useful in the present disclosure include redox initiator systems having (i) a barbituric acid derivative and/or a malonyl sulfamide and (ii) an organic peroxide, selected from the group of the mono- or multifunctional carboxylic acid peroxide esters. There can be used as barbituric acid derivatives, for example, 1,3,5-trimethylbarbituric acid, 1,3,5-triethylbarbituric acid, 1,3-dimethyl-5-ethylbarbituric acid, 1,5-dimethylbarbituric acid, 1-methyl-5-ethylbarbituric acid, 1-methyl-5-propylbarbituric acid, 5-ethylbarbituric acid, 5-propylbarbituric acid, 5-butylbarbituric acid, 1-benzyl-5-phenylbarbituric acid, 1-cyclohexyl-5-ethylbarbituric acid and the thiobarbituric acids mentioned in the German patent application DE-A-42 19 700.

The barbituric acids and barbituric acid derivatives described in German patent specification DE-C-14 95 520 as well as the malonyl sulfamides named in the European patent specification EP-B-0 059 451 are well suited. Preferred malonyl sulfamides are 2,6-dimethyl-4-isobutylmalonyl sulfamide, 2,6-diisobutyl-4-propylmalonyl sulfamide, 2,6-dibutyl-4-propylmalonyl sulfamide, 2,6-dimethyl-4-ethylmalonyl sulfamide or 2,6-dioctyl-4-isobutylmalonyl sulfamide.

The presently disclosed redox initiator system contains mono- or multifunctional carboxylic acid peroxyesters as organic peroxides. Carbonic peroxyesters are also included among the multifunctional carboxylic acid peroxyesters within the meaning of the present application. Suitable examples include carbonic-diisopropyl-peroxydiester, neodecanoic acid-tertiary-butyl-peroxyester, neodecanoic acid-tertiaryamyl-peroxyester, maleic acid-tertiary-butyl-monoperoxyester, benzoic acid-tertiary-butyl-peroxyester, 2-ethylhexanoic acid-tertiary-butyl-peroxyester, 2-ethylhexanoic acid-tertiaryamyl-peroxyester, carbonic-monoisopropylester-monotertiary-butyl-peroxyester, carbonic-dicyclohexyl-peroxyester, carbonic dimyristyl-peroxyester, carbonic dicetyl peroxyester, carbonic-di(2-ethylhexyl)-peroxyester, carbonic-tertiary-butyl-peroxy-(2-ethylhexyl)ester or 3,5,5-trimethylhexanoic acid-tertiary-butyl-peroxyester, benzoic acid-tertiaryamyl-peroxyester, acetic acid-tertiary-butyl-peroxyester, carbonic-di(4-tertiary-butyl-cyclohexyl)-peroxyester, neodecanoic acid-cumene-peroxyester, pivalic acid-tertiary-amyl-peroxyester and pivalic acid tertiary-butyl-peroxyester.

In particular, carbonic-tertiary-butyl-peroxy-(2-ethylhexyl)ester or 3,5,5-trimethyl-hexanoic acid-tertiary-butyl-peroxyester can be used as organic peroxides according to the present disclosure.

We found that the addition of both high aspect ratio fillers and fumed silica improved overlap shear and peel strengths more than either alone, and provided improved properties compared to surface modified clay fillers.

For the present inventive adhesives, it is desirable to obtain overlap shear strengths of greater than 20 MPa and peel strengths of >2.5 kN/m, preferably >3.5 kN/m. In addition, the failure should occur within the adhesive (cohesive failure).

Some non-limiting exemplary embodiments and combinations of embodiments follow:

1. An adhesive composition comprising: a) at least one acrylic functional monomer; b) a first toughening agent; c) a second toughening agent; d) an adhesion promoter; and e) a high aspect ratio filler selected from at least one of a high aspect ratio fibrillated filler and a halloycite clay filler.

2. The adhesive composition of embodiment 1 wherein the high aspect ratio filler is surface treated to improve miscibility with resins.

3. The adhesive composition of any of the preceding embodiments further comprising fumed silica.

4. The adhesive composition of any of the preceding embodiments wherein the first toughening agent is selected from at least one of a block copolymer, a core-shell particle, and combinations thereof.

5. The adhesive composition of embodiment 4 wherein the block copolymer is selected from a styrene-b-butadiene-b-polymethylmethacrylate block copolymer or a polymethyl methacrylate-b-poly n-butylacrylate-b-polymethylmethacrylate block copolymer.

5.a. The adhesive composition of embodiment 4 wherein the block copolymer is selected from a polystyrene-b-butadiene-b-(methyl methacrylate) block copolymer or a poly (methyl methacrylate)-b-poly (n-butyl acrylate)-b-poly(methyl methacrylate) block copolymer.

6. The adhesive composition of any of the preceding embodiments wherein the second toughening agent is a methacrylate terminated liquid rubber.

7. The adhesive composition of any of the preceding embodiments wherein the adhesion promoter is an acidic adhesion promoter.

8. The adhesive composition of any of the preceding embodiments wherein the high aspect ratio fibrillated filler is micro-fibrillated.

9. The adhesive composition of embodiment 3 wherein the composition has a peel value of greater than 3.5 kN/m.

10. The adhesive composition of any of embodiment 3 wherein the composition has a peel value of greater than 4.4 kN/m.

11. The adhesive composition of any of the preceding embodiments having substantially cohesive failure.

12. The adhesive composition of any of the preceding embodiments further comprising a cure initiator system.

13. The adhesive composition of embodiment 12 wherein the cure initiator system comprises a barbituric acid derivative and a metal salt.

14. The adhesive composition of embodiment 13 wherein the cure initiator system further comprises an organic peroxide, ammonium chloride salt, or a mixture thereof.

Various modifications and alterations of this invention will become apparent to those skilled in the art without departing from the scope and spirit of this invention.

Test Methods

Each adhesive composition was loaded into the 10 part side of a 10:1 dual syringe cartridge dispenser, using the accelerator described above in the 1 part side of the dispenser in each case. All bonds were prepared by dispensing the adhesive composition and accelerator through a static mixing tip.

The adhesives were used to prepare overlap shear and peel test samples on 2024 T3 AlClad aluminum substrates. For peel samples, the aluminum was chemically cleaned and etched as per ASTM D 2651. Overlap shear was measured according to ASTM D 1002. Bell peel was measured according to ASTM D 3167. Panels of thick metal, measuring 10.16×17.78×0.16 cm thick, and thin metal measuring 10.16×25.4×0.051 cm thick, were each coated with the test adhesive and 0.069 mm spacer beads were sprinkled onto the bond line. Weights were placed on the panels for 24 hours at 25° C., then the panels were cut to 2.54 cm width, after the adhesive has cured, yielding three 2.54 cm wide specimens per panel. These were tested in floating roller peel. Results are reported in pounds per inch width (piw) and are the average of 3 samples.

Overlap shear samples were 2.54×10.16×16 cm aluminum coupons using 0.076-0.0127 mm spacer beads with a 1.27 cm overlap. The bond line was clamped with binder clips during cure and the clips were removed after 24 hours at 25° C. Testing was run on a 5000 lb load cell for overlap shear and 200 lb load cell for peel testing with pulling for both at 2.54 mm/min.

Materials

These examples are merely for illustrative purposes only and are not meant to be limiting on the scope of the appended claims. All parts, percentages, ratios, and the like in the examples are by weight, unless noted otherwise. Materials used were obtained from Sigma-Aldrich Chemical Company; Milwaukee, Wis. unless otherwise noted.

| | |
|---|---|
| MMA | methyl methacrylate |
| NANOSTRENGTH M53 | polymethyl methacrylate-b-poly-n-butylacrylate-b-polymethyl methacrylate (MAM) triblock copolymer (Arkema, Inc., King of Prussia, Pennsylvania) |
| NANOSTRENGTH E21 | Styrene-b-butadiene-b-polymethylmethacrylate (SBM) triblock copolymer (Arkema) |
| PAM 200 | methacrylated phosphate adhesion promoter (Rhodia, Cranberry, New Jersey) |
| CUNAP | copper naphthenate 8% in mineral spirits (Strem) |
| N+Cl− | Benzyl tributylammonium chloride (Sachem Americas, Austin, Texas) |
| SR 540 and SR 541 | ethoxylated bisphenol A dimethacrylates with varying degrees of ethoxylation (Sartomer Technology USA, LLC, Wilmington, Delaware) |
| VTBN 33 and VTBN 43 | vinyl terminated butadiene - acrylonitrile rubber (Emerald Materials, LLC, Cuyahoga Falls, Ohio) |
| ESS50F | micro fibrillated polyethylene, hydrophilic grade, aspect ratio 20:1 l:d (MiniFibers, Inc., Johnson City, Tennessee) |
| INHANCE PEF | oxidized, fibrillated polyethylene (Inhance/Fluoro-Seal, Ltd., Houston, Texas) |
| INHANCE HD 1800 | oxidized fine high density polyethylene (HDPE) powder (Inhance) |
| POLYFIL WC | vinyl silane treated alumina silicate clay (KaMin Performance Minerals, Macon, Georgia) |
| CAB-O-SIL TS 720 | silicone treated fumed silica (Cabot Corporation, Tuscola, Illinois) |
| AEROSIL R 7200 | destructured methacrylate treated fumed silica (Evonik Degussa Corporation, Parsippany, New Jersey) |
| HEMA | hydroxyl ethyl methacrylate |
| Peroxybenzoate | t-butyl-3,5,5-trimethylhexanoate (Acros) |
| BENZOFLEX 9-88 | polyether benzoate (Eastman Chemical Company, Kingsport, Tennessee) |
| | Benzyl phenyl barbituric acid |
| MX 921 | tetrahydrofurfuryl methacrylate with 25% acrylic core shell (Kaneka Corporation, Osaka, Japan) |
| SR203 | tetrahydrofurfuryl methacrylate (Sartomer) |
| SR340 | phenoxy ethyl methacrylate (Sartomer) |

| | |
|---|---|
| NYAD 1250 | wollastonite clay, aspect ratio 3:1 l:d (NYCO Minerals, Inc., Willsboro, New York) |
| MINEX 7 | aluminum silicate, spherical (UNIMIN Specialty Materials, Inc., New Canaan, Connecticut) |
| DRAGONITE XR | halloysite clay (Applied Minerals, Inc., New York, New York) |

EXAMPLES

The following examples are merely for illustrative purposes and are not meant to limit in any way the scope of the appended claims. All parts, percentages, ratios, and the like in the examples are by weight, unless noted otherwise.

Accelerator Side:

All adhesive compositions used an accelerator having 82.7 pph BENZOFLEX 9-88, 13.5 pph benzyl phenyl barbituric acid, 1.9 pph peroxybenzoate, 1.9 pph CAB-O-SIL TS 720. The components were weighed into a plastic container, then placed in a planetary-type mixer such as that available under the trade designation "SPEED MIXER", Model DA 400 FV, from Synergy Devices Limited, Buckinghamshire, United Kingdom) set at a speed of 2500 rpm for 2 minute, followed by impellor mixing until no agglomerates of the barbituric acid were observed.

Base Side of Adhesives for Examples 1-2 and CE 1-2:

A solution of 70 parts MMA with 30 parts NANOSTRENGTH E21 was prepared by dispersing the NANOSTRENGTH E21 into the MMA in a jar, then rolling the jar overnight to obtain a clear solution.

Stock Solution for EX 1, EX 2, CE1 and CE2:

A solution of 5.5% N+Cl— in HEMA was prepared by adding the 5.5 g N+Cl— to 94.5 g HEMA and manually shaking until the N+Cl— was completely dissolved. The weight percents are based on the total weight of the solution. An adhesive stock solution was then prepared by mixing 200 g of the MMA/E21 solution prepared previously, 3.8 g PAM 200, 0.3 g CUNAP, and 6.9 g of the N+Cl—/HEMA solution.

The adhesive compositions shown in the following Table 1 were prepared by weighing the specified components into DAC Speedmixer cups and then mixed using a DAC Speedmixer at approximately 2500 rpm for 2 minutes.

TABLE 1

| Example | Stock Solution | SR 541 | VTBN 33 | ESS50F | INHANCE PEF | POLYFIL WC | CAB-O-SIL TS 720 |
|---|---|---|---|---|---|---|---|
| EX1 | 50.0 g | 2.0 g | 3.0 g | 2.0 g | | | |
| EX2 | 50.0 g | 2.0 g | 3.0 g | | 2.0 g | | |
| CE1 | 50.0 g | 2.0 g | 3.0 g | | | 5.0 g | 0.5 g |
| CE2 | 50.0 g | 2.0 g | 3.0 g | | | 10.0 g | 0.5 g |

For Comparative Example 1 (CE1) and Comparative Example 2 (CE 2), the amount of POLYFIL WC was increased to nearly 2.5 times the amount of ESS50F or INHANCE PEF used in Examples 1 and 2, respectively, in order to provide approximately the same volume percent of filler material for all samples. This was done because the density of the POLYFIL WC is 2.6 g/cm3, which is nearly 2.5 times the density ESS50F or INHANCE PEF. CAB-O-SIL TS 720 was added to CE1 and CE2 to reduce settling of the POLYFIL WC.

These adhesive compositions were evaluated for overlap shear and peel strengths, and failure mode according to the test method outlined above. Results for these tests are reported in Table 2.

TABLE 2

| | | Shear (MPa) | Peel (kN/m) |
|---|---|---|---|
| EX1 | Ave. | 25.4 | 4.46 |
| | standard dev (SD) | 1.25 | 0.017 |
| | failure | cohesive | cohesive |
| EX2 | Ave. | 24.85 | 3.73 |
| | SD | .51 | .14 |
| | failure | cohesive | cohesive |
| CE1 | Ave. | 31.2 | 2.12 |
| | SD | 3.87 | .105 |
| | failure | mixed adhesive | very thin cohesive |
| CE2 | Ave. | 29.9 | 1.40 |
| | SD | 1.83 | .21 |
| | failure | mixed adhesive | cohesive |

Table 2 shows the improved overall performance using the ESS50F or INHANCE PEF versus using POLYFIL WC.

Base Side of Adhesives for EX3, EX4, EX5 and CE3:

Using the MMA/Nanostrength E21 and N+Cl—/HEMA solutions described above a stock solution was prepared having 220 g MMA/E21, 11.0 g SR 540, 11.0 g VTBN 33, 2.3 g PAM 200, 0.32 g CUNAP (in mineral spirits), and 7.6 g N+Cl—/HEMA stock solution. The adhesive compositions shown in the following Table 3 were prepared as described in EX1:

TABLE 3

| Example | Stock Solution | ESS50F | POLYFIL WC | CAB-O-SIL TS 720 |
|---|---|---|---|---|
| EX3 | 47.0 g | 3.0 g | | |
| CE3 | 47.0 | | 3.0 g | |
| EX4 | 47.0 | 1.5 g | | 1.5 g |
| EX5 | 47.0 | 1.0 g | 1.0 g | 1.0 |

The adhesive compositions shown in Table 3 were evaluated for overlap shear and peel strength and failure mode according to the test method outlined above. Results for these tests are reported in Table 4.

TABLE 4

|  |  | Shear (MPa) | Peel (kN/m) |
|---|---|---|---|
| EX3 | Ave. | 22.6 | 3.15 |
|  | SD | 1.53 | 0.017 |
|  | failure | cohesive | cohesive |
| CE3 | Ave. | 20.86 | 3.64 |
|  | SD | 4.26 | 0.017 |
|  | failure | mixed adhesive | thin cohesive |
| EX4 | Ave. | 24.9 | 4.46 |
|  | SD | 1.14 | 0.035 |
|  | failure | cohesive | thin cohesive |
| EX5 | Ave. | 24.7 | 5.03 |
|  | SD | 4.84 | 0.11 |
|  | failure | cohesive | cohesive |

Base Side of adhesives for EX6-10 and CE4-14.

A solution of 70 parts MMA with 30 parts NANOSTRENGTH E21 or NANOSTRENGTH M53 was prepared by dispersing the NANOSTRENGTH E21 or NANOSTRENGTH M53 into the MMA in a jar, then rolling the jar overnight using a roller table to obtain a clear solution.

Stock Solution for EX6-10 and CE4-14:

A stock solution of 5.5% N+Cl— in HEMA was prepared as described previously and used to prepare the following solutions.

Master Batches EX6-10 and CE4-14:

The MMA/Nanostrength M53 (EX 6-7 and CE4-6) or E21 (EX8-9 and CE7-9) solution and all other components, totaling 275 g, were weighed into MAX 300 DAC Speedmixer in the amount given in Table 5 below and then mixed for 2 minutes at 2500 rpm. Separate MAX 100 cups were then each charged with 46.0 g of the mixtures obtained and the various fillers were added and mixed for 1 minute at 2500 rpm. The fillers used are summarized in Table 6. The resulting adhesive compositions are shown in Table 7 and Table 8. These adhesive compositions were loaded into the 10 part compartment of 10:1 cartridges, with the accelerator described above loaded into the 1 part compartment.

TABLE 5

| Material | pph |
|---|---|
| MMA (from stock) | 54.9 |
| NANOSTRENGTH M53 or E21 (from stock) | 23.5 |
| VTBN 33 or VTBN 43 | 11.7 |
| SR541 or SR 540 | 4.0 |
| CUNAP | 0.091 |
| PAM200 | 1.96 |

TABLE 6

| Sample Number | Filler |
|---|---|
| CE4 and CE7 | None |
| EX6 and EX8 | DRAGONITE |
| EX7 and EX9 | DRAGONITE |
| CE5 and CE8 | POLYFIL WC |
| CE6 and CE9 | NYAD 1250 |
| N+Cl— (from stock) | 0.21 |
| HEMA (from stock) | 3.71 |

TABLE 7

|  | CE4 | EX6 | EX7 | CE5 | CE6 |
|---|---|---|---|---|---|
| MMA | 53.68 | 52.02 | 50.46 | 50.46 | 50.46 |
| NANOSTRENGTH M53 | 23.01 | 22.30 | 21.63 | 21.63 | 21.63 |
| VTBN 43 | 11.42 | 11.07 | 10.73 | 10.73 | 10.73 |
| SR541 | 3.91 | 3.79 | 3.68 | 3.68 | 3.68 |
| CUNAP | 0.09 | 0.09 | 0.08 | 0.08 | 0.08 |
| PAM200 | 1.92 | 1.86 | 1.81 | 1.81 | 1.81 |
| TS 720 | 2.13 | 0.00 | 3.00 | 3.00 | 3.00 |
| N+Cl— | 0.21 | 0.20 | 0.20 | 0.20 | 0.20 |
| HEMA | 3.63 | 3.52 | 3.41 | 3.41 | 3.41 |
| Filler | 0.00 | 5.15 | 5.00 | 5.00 | 5.00 |
| Total | 100 | 100 | 100.00 | 100.00 | 100.00 |

TABLE 8

|  | CE7 | EX8 | EX9 | CE8 | CE9 |
|---|---|---|---|---|---|
| MMA | 58.77 | 57.55 | 55.827 | 55.827 | 55.827 |
| NANOSTRENGTH E21 | 25.19 | 24.67 | 23.926 | 23.926 | 23.926 |
| VTBN 33 | 5.45 | 5.34 | 5.175 | 5.175 | 5.175 |
| SR 540 | 3.32 | 3.25 | 3.155 | 3.155 | 3.155 |
| CUNAP | 0.09 | 0.09 | 0.089 | 0.089 | 0.089 |
| PAM200 | 1.12 | 1.10 | 1.063 | 1.063 | 1.063 |
| TS 720 | 3.16 | 0.00 | 3.000 | 3.000 | 3.000 |
| N+Cl— | 0.16 | 0.16 | 0.152 | 0.152 | 0.152 |
| HEMA | 2.75 | 2.69 | 2.613 | 2.613 | 2.613 |
| Filler | 0.00 | 5.15 | 5.000 | 5.000 | 5.000 |
| Total | 100.00 | 100.00 | 100.000 | 100.000 | 100.000 |

The adhesive compositions shown in Tables 7 and 8 were evaluated for overlap shear, strength, peel strengths and failure mode according to the test methods outlined above. Results for these tests are reported in Table 9.

TABLE 9

|  | OLS (MPa) | Peel (kN/m) |
|---|---|---|
| CE4 | 30.9 | 2.99 |
|  | mixed adhesive | adhesive |
| EX6 | 26.8 | 4.38 |
|  | mixed adhesive/cohesive | thin cohesive |
| EX7 | 28.3 | 7.22 |
|  | mixed thin cohesive | thin cohesive |
| CE5 | 30.4 | 4.55 |
|  | mixed adhesive | mixed adhesive/cohesive |
| CE6 | 28.7 | 4.76 |
|  | mixed adhesive | mixed adhesive/cohesive |
| CE7 | 26.8 | 4.94 |
|  | mixed adhesive | thin cohesive |
| EX8 | 31.5 | 2.47 |
|  | cohesive | thin cohesive |
| EX9 | 29.5 | 4.48 |
|  | cohesive | thin cohesive |
| CE8 | 15.0 | 3.73 |
|  | mixed cohesive | thin cohesive |
| CE9 | 28.7 | 4.74 |
|  | mixed cohesive | thin cohesive |

Example 10 and Comparative Examples 10-14

Adhesive components, totaling 300 g, were weighed into MAX 300 DAC Speedmixer in the relative amounts given in Table 10 below and then mixed for 2 minutes at 2500 rpm. The stock solutions of N+Cl— previously described was used. Separate MAX 100 cups were then each charged with 50.0 g of the mixture obtained and 5.0 g of the various fillers and mixed for 1 minute at 2500 rpm, giving final formulations described in Table 11 with the various fillers identified in Table 12.

TABLE 10

| Material | pph |
|---|---|
| SR203 | 19.5 |
| THFMX | 16.9 |
| SR340 | 11.9 |
| HEMA | 16.1 |
| VTBN 33 | 21.2 |
| Cu | 0.10 |
| PAM | 3.4 |
| TS720 | 2.50 |
| N+Cl−/HEMA | 5.1 |
| ESS50F | 3.4 |

TABLE 11

| Material | pph |
|---|---|
| SR203 | 17.60 |
| THFMX | 15.33 |
| SR340 | 10.72 |
| HEMA | 18.95 |
| VTBN 33 | 19.40 |
| CUNAP | 0.12 |
| PAM | 3.10 |
| TS720 | 2.33 |
| N+Cl− | 0.26 |
| ESS50F | 3.10 |
| Filler | 9.09 |
|  | 100.00 |

TABLE 12

| Sample Number | Filler |
|---|---|
| EX10 | DRAGONITE |
| CE10 | POLYFIL WC |
| CE11 | INHANCE HD 1800 |
| CE12 | NYAD 1250 |
| CE13 | AEROSIL R 7200 |
| CE14 | MINEX 7 |

This adhesive set represents a lower odor acrylic adhesive relative to the MMA adhesives described above. These adhesives were used to bond overlap shear and peel samples as described above. The results of this testing are reported in Table 13.

TABLE 13

| | OLS (MPa) | Peel (kN/m) |
|---|---|---|
| EX10 | 19.7 | 5.50 |
| | cohesive | cohesive |

TABLE 13-continued

| | OLS (MPa) | Peel (kN/m) |
|---|---|---|
| CE10 | 19.1 | 3.20 |
| | mixed adhesive | cohesive |
| CE11 | 18.4 | 5.01 |
| | mixed adhesive/cohesive | cohesive |
| CE12 | 17.1 | 5.57 |
| | mixed adhesive/cohesive | cohesive |
| CE13 | 18.1 | 4.25 |
| | mixed adhesive | cohesive |
| CE14 | 17.8 | 5.53 |
| | mixed adhesive/cohesive | cohesive |

What is claimed is:

1. An adhesive composition comprising:
   a) at least one acrylic functional monomer;
   b) a first toughening agent selected from at least one of a block copolymer, a core-shell particle, and combinations thereof;
   c) a second toughening agent, wherein the second toughening agent is a methacrylate terminated liquid rubber;
   d) an adhesion promoter; and
   e) a high aspect ratio filler selected from at least one of a high aspect ratio fibrillated filler and a halloycite clay filler.

2. The adhesive composition of claim 1 wherein the high aspect ratio filler is surface treated to improve miscibility with resins.

3. The adhesive composition of claim 1 further comprising fumed silica.

4. The adhesive composition of claim 1 wherein the block copolymer is selected from a polystyrene-b-butadiene-b-(methyl methacrylate) block copolymer or a poly(methyl methacrylate)-b-poly(n-butyl acrylate)-b-poly(methyl methacrylate) block copolymer.

5. The adhesive composition of claim 1 wherein the adhesion promoter is an acidic adhesion promoter.

6. The adhesive composition of claim 1 wherein the high aspect ratio fibrillated filler is micro-fibrillated.

7. The adhesive composition of claim 3 wherein the composition has a peel value of greater than 3.5 kN/m.

8. The adhesive composition of claim 3 wherein the composition has a peel value of greater than 4.4 kN/m.

9. The adhesive composition of claim 1 having substantially cohesive failure.

10. The adhesive composition of claim 1 further comprising a cure initiator system.

11. The adhesive composition of claim 10 wherein the cure initiator system comprises a barbituric acid derivative and a metal salt.

12. The adhesive composition of claim 11 wherein the cure initiator system further comprises an organic peroxide, ammonium chloride salt, or a mixture thereof.

* * * * *